(12) United States Patent
Glovier

(10) Patent No.: US 11,944,028 B2
(45) Date of Patent: Apr. 2, 2024

(54) SYSTEMS AND METHODS FOR MONITORING THE INSTALLATION STATUS OF A SHANK ATTACHMENT MEMBER OF AN AGRICULTURAL IMPLEMENT

(71) Applicant: CNH Industrial America LLC, New Holland, PA (US)

(72) Inventor: Scott Glovier, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 739 days.

(21) Appl. No.: 16/540,315

(22) Filed: Aug. 14, 2019

(65) Prior Publication Data
US 2021/0045282 A1 Feb. 18, 2021

(51) Int. Cl.
*A01B 76/00* (2006.01)
*A01B 15/04* (2006.01)
*A01B 35/22* (2006.01)

(52) U.S. Cl.
CPC .............. *A01B 76/00* (2013.01); *A01B 15/04* (2013.01); *A01B 35/225* (2013.01)

(58) Field of Classification Search
CPC ........ A01B 76/00; A01B 15/04; A01B 35/225
See application file for complete search history.

(56) References Cited

U.S. PATENT DOCUMENTS

| | | | | |
|---|---|---|---|---|
| 1,596,389 A | * | 8/1926 | Barnhart | A01B 35/26 172/737 |
| 3,450,212 A | * | 6/1969 | Sylvester | A01B 15/025 172/699 |

(Continued)

FOREIGN PATENT DOCUMENTS

| | | |
|---|---|---|
| AU | 2012/215112 | 8/2012 |
| CA | 2993410 A1 | 2/2017 |

(Continued)

OTHER PUBLICATIONS

The International Search Report and Written Opinion Corresponding to Application No. PCT/US2020/045852 dated Nov. 23, 2020 (12 pages).

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A system for monitoring an installation status of shank attachment members of agricultural implements may include a shank assembly. The shank assembly may have a shank and at least one mounting element configured to couple the shank to a portion of an agricultural implement. The system may further include a shank attachment member coupled to the shank and a signal transmission device provided in operative association with the shank attachment member. The system may further include an antenna provided in operative association with the shank assembly, where the antenna is configured to receive wireless signals transmitted by the signal transmission device. Additionally, the system may include a controller communicatively coupled to the antenna and configured to determine an installation status of the shank attachment member based at least in part on the wireless signals received by the antenna.

12 Claims, 6 Drawing Sheets

(56) References Cited

U.S. PATENT DOCUMENTS

| | | | | |
|---|---|---|---|---|
| 3,704,459 | A | * | 11/1972 | Young .................... A01C 7/105 340/671 |
| 4,057,112 | A | * | 11/1977 | Taylor .................... A01B 13/08 172/166 |
| 4,262,751 | A | * | 4/1981 | Grear .................... A01B 61/042 172/271 |
| 5,641,026 | A | * | 6/1997 | Balmer ................ A01B 61/046 172/311 |
| 5,695,012 | A | * | 12/1997 | Kesting .................. A01B 13/08 172/166 |
| 7,198,295 | B2 | * | 4/2007 | Biziorek et al. ........ A01B 61/04 172/235 |
| 8,890,672 | B2 | | 11/2014 | Miller |
| 8,943,717 | B2 | | 2/2015 | Renski et al. |
| 9,338,937 | B2 | | 5/2016 | Sauder et al. |
| 9,714,923 | B2 | | 7/2017 | Behmlander et al. |
| 9,805,234 | B1 | | 10/2017 | Baum et al. |
| 10,011,975 | B2 | | 7/2018 | Carpenter et al. |
| 10,024,033 | B2 | | 7/2018 | Bewley et al. |
| 10,024,034 | B2 | | 7/2018 | Nicoson et al. |
| 10,130,022 | B2 | | 11/2018 | Blackwell et al. |
| 11,015,993 | B2 | * | 5/2021 | Glovier et al. ......... A01B 76/00 |
| 2011/0057776 | A1 | | 3/2011 | Biziorek |
| 2013/0049935 | A1 | | 2/2013 | Miller |
| 2015/0081177 | A1 | | 3/2015 | Kawasaki et al. |
| 2015/0149027 | A1 | | 5/2015 | Paulsen et al. |
| 2016/0223511 | A1 | | 8/2016 | Koshnick et al. |
| 2016/0237657 | A1 | | 8/2016 | Carpenter et al. |
| 2017/0196160 | A1 | | 7/2017 | Bjerketvedt et al. |
| 2018/0206393 | A1 | | 7/2018 | Stoller et al. |
| 2018/0288929 | A1 | | 10/2018 | Kovach |
| 2018/0310465 | A1 | | 11/2018 | Peterson et al. |
| 2018/0310466 | A1 | | 11/2018 | Kovach et al. |
| 2019/0063473 | A1 | | 2/2019 | Barrick et al. |
| 2020/0305336 | A1 | * | 10/2020 | Harmon ................ G05B 19/042 |
| 2020/0308810 | A1 | * | 10/2020 | Harmon ................ G07C 5/006 |

FOREIGN PATENT DOCUMENTS

| EP | 1900269 A1 | 3/2008 |
|---|---|---|
| EP | 2018981 A1 | 1/2009 |

OTHER PUBLICATIONS

"'Shear Bolt Monitor' for Ripper and Knife Shanks," Farm Show Magazine, vol. 42, Issue 2, p. 24, 2018.

"Shank Patrol—Real Time Shank Bolt Detection," dated Apr. 9, 2019 (2 pages).

* cited by examiner

SYSTEMS AND METHODS FOR MONITORING THE INSTALLATION STATUS OF A SHANK ATTACHMENT MEMBER OF AN AGRICULTURAL IMPLEMENT

FIELD OF THE INVENTION

The present subject matter relates generally to agricultural implements and, more particularly, to systems and related methods for monitoring the installation status of shank attachment members of an agricultural implement.

BACKGROUND OF THE INVENTION

A wide range of agricultural implements have been developed and are presently in use for tilling, cultivating, harvesting, and so forth. Tillage implements, for example, are commonly towed behind tractors and may cover wide swaths of ground that include various types of residue. Such residue may include materials left in the field after the crop has been harvested (e.g., stalks and stubble, leaves, and seed pods). Good management of field residue can increase efficiency of irrigation and control of erosion in the field.

Tillers typically include ground-engaging tools, such as shanks and shank attachment members e.g., tillage points, chisels, etc.), configured to condition the soil for improved moisture distribution while reducing soil compaction from sources such as machine traffic, grazing cattle, and standing water. The shank attachment members are typically replaceable and come in a wide variety to accommodate different field conditions and the desired results of the tilling operation. Unfortunately, when a shank attachment member falls off or otherwise decouples from its respective shank during operation, the shank attachment member is typically difficult to find and expensive to replace, and the shank may also need to be replaced if the implement is operated for an extended period without a shank attachment member, which further increases the cost of a lost shank attachment member.

Accordingly, a system and method for improved monitoring of the installation status of shank attachment members configured for use with an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a system for monitoring an installation status of shank attachment members of agricultural implements. The system includes a shank assembly having a shank extending between a proximal end and a distal end. The shank assembly further has at least one mounting element configured to couple the proximal end of the shank to a portion of an agricultural implement. Further, the system includes a shank attachment member coupled to the distal end of the shank. The system also includes a signal transmission device provided in operative association with the shank attachment member, where the signal transmission device is configured to transmit wireless signals. Moreover, the system includes an antenna provided in operative association with the shank assembly, with the antenna being configured to receive the wireless signals transmitted from the signal transmission device. Additionally, the system includes a controller communicatively coupled to the antenna, where the controller is configured to determine an installation status of the shank attachment member based at least in part on the wireless signals received by the antenna from the signal transmission device.

In another embodiment, the present subject matter is directed to an agricultural implement. The agricultural implement includes a frame and a plurality of shank assemblies coupled to the frame. Each shank assembly of the plurality of shank assemblies has a shank extending between a proximal end and a distal end, and at least one mounting element configured to couple the proximal end of the shank to a portion of the frame. The agricultural implement further includes a plurality of shank attachment members, with each shank attachment member of the plurality of shank attachment members being coupled to the distal end of the shank of a respective shank assembly of the plurality of shank assemblies. The agricultural implement also includes a signal transmission device provided in operative association with at least one shank attachment member of the plurality of shank attachment members, where the signal transmission device is configured to transmit wireless signals. Furthermore, the agricultural implement includes an antenna configured to receive the wireless signals transmitted from the signal transmission device. Additionally, the agricultural implement includes a controller communicatively coupled to the antenna. The controller is configured to determine an installation status of the at least one shank attachment member based at least in part on the wireless signals received by the antenna from the signal transmission device.

In a further embodiment, the present subject matter is directed to a method for monitoring an installation status of shank attachment members of an agricultural implement. The agricultural implement has a shank assembly having a shank extending between a proximal end and a distal end, and at least one mounting element configured to couple the proximal end of the shank to a portion of the agricultural implement. The agricultural implement further has a shank attachment member coupled to the distal end of the shank. The method includes receiving, with a computing device, wireless signals from a signal transmission device provided in operative association with the shank attachment member. The method further includes identifying, with the computing device, an installation status of the shank attachment member based at least in part on the received wireless signals. Additionally, the method includes initiating, with the computing device, a control action when it is identified that the shank attachment member is detached from the shank.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
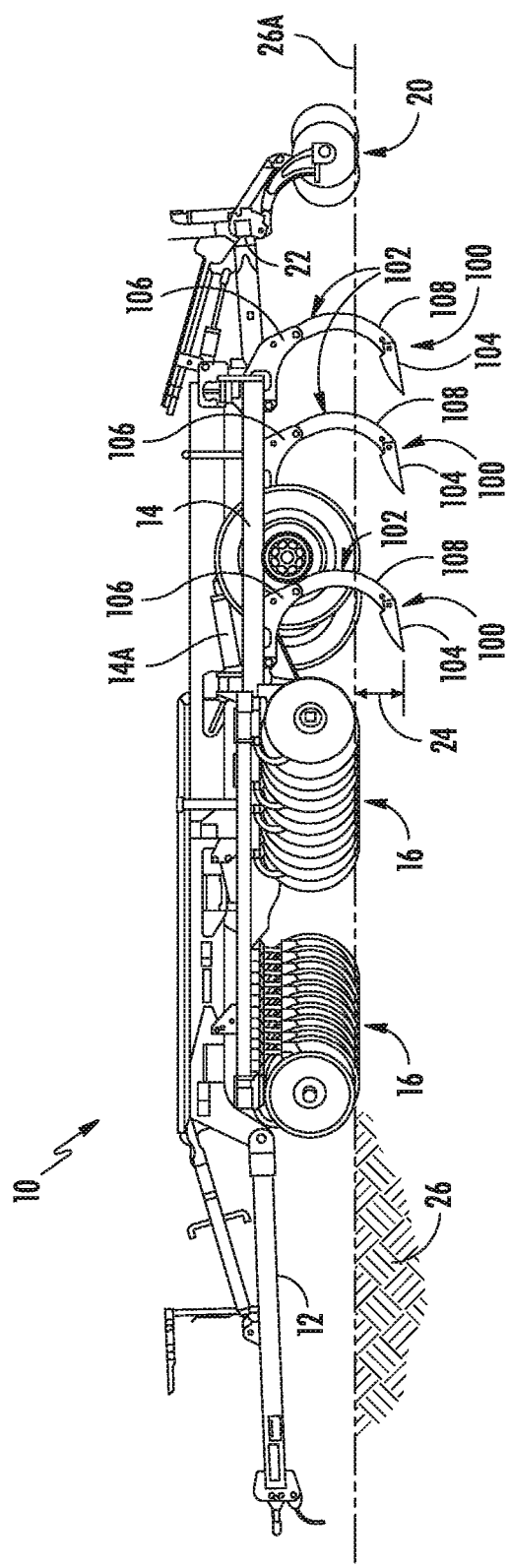
FIG. 1 illustrates a side view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the installation status of shank attachment members (e.g., tillage points, chisels, etc.) of an agricultural implement, such as the presence of a given shank attachment member. Specifically, in several embodiments, the disclosed system may include one or more wireless signal transmission devices (e.g., RFID tags) configured to wirelessly transmit signals to an associated signal receiver or antenna. In general, each signal transmission device may be configured to be installed on and/or within an associated shank attachment member at a suitable location that allows the transmission device to transmit wireless signals to the corresponding antenna when the shank attachment member is coupled to its respective shank. When the shank attachment member falls off or is otherwise no longer attached to its respective shank, the antenna will no longer receive the wireless signals transmitted from the transmission device. By detecting the signals (or the lack of any signals), an associated controller or computing device of the system may infer or determine the installation status or presence of the shank attachment members(s) relative to its respective shank(s), including determining when the shank attachment member(s) has become detached. Once it is determined that a shank attachment member has become detached from its respective shank, the controller may, for example, indicate the installation status of the monitored shank attachment member(s) (e.g., via a user interface) to the operator, and/or initiate one or more control actions, such as raising the frame of the implement and/or stopping the implement.

Referring now to the drawings, FIG. 1 illustrates one embodiment of a tillage implement 10 in accordance with aspects of the present subject matter. As is generally understood, the tillage implement 10 may be used to till a field to prepare the soil by plowing, ripping, turning, and/or the like. In doing so, a portion of the soil residue, such as plant stalks and/or weeds, may be removed during the tilling process. In addition, the soil may be loosened and aerated, which in turn facilitates deeper penetration of roots. The tilling process may also help in the growth of microorganisms present in the soil and thus, maintain the fertility of the soil.

As shown in FIG. 1, the tillage implement 10 includes a tow bar 12 having a coupling mechanism, such as a hitch, used to couple the implement 10 to a towing vehicle, such as a tractor. The tillage implement 10 may also include a frame 14 and a plurality of ground-engaging tools coupled to or otherwise supported by the frame 14, such as one or more disk blades, plows, chisels, hoe openers, tillage points, rolling baskets, and/or the like. For instance, in the illustrated embodiment, the tillage implement 10 includes a plurality of forward disc blades 16, a plurality of shank assemblies 100, and a plurality of soil-leveling discs 20 coupled to the frame 14, with the shank assemblies 100 being located aft of the forward disc blades 16 on the frame 14 and the soil-leveling discs 20 being positioned aft of the shank assemblies 100 on the frame 14 (e.g., via an associated tool bar 22). The frame 14 is configured to be actuated relative to the ground surface 26A between a raised position (not shown) and a lowered or working position (FIG. 1) by one or more frame actuators 14A.

As shown in FIG. 1, in one embodiment, each shank assembly 100 may include a shank 102 pivotally coupled to the implement frame 14 at one end by one or more frame members. A shank attachment member 104 may be coupled to the shank assembly 100, particularly at an opposed end of the shank 102 from the frame member(s). In the embodiment shown, each shank attachment member 104 corresponds to a tillage point. As is generally understood, the tillage points 104 may be configured to enable high-speed operation of the tillage implement 10 while still producing a smooth soil surface. As shown in the illustrated embodiment, the shank assemblies 100 are positioned to till a field at a depth 24 below the field or ground surface 26A, with the depth 24 of the tillage points 104 being adjustable by raising or lowering the shank assemblies 100 and/or the portions of the frame 14 relative to the field. For example, the depth 24 may be adjusted, as desired, based on local farming practices and/or field conditions. For purposes of discussion, the present subject matter will generally be described with reference to the illustrated tillage points 104. However, it should be appreciated that, in other embodiments, each shank attachment member 104 may correspond to any other ground-engaging member configured to be coupled or attached to the distal end of a shank 102, e.g., chisels, hoe openers, and/or the like.

Figure 2:
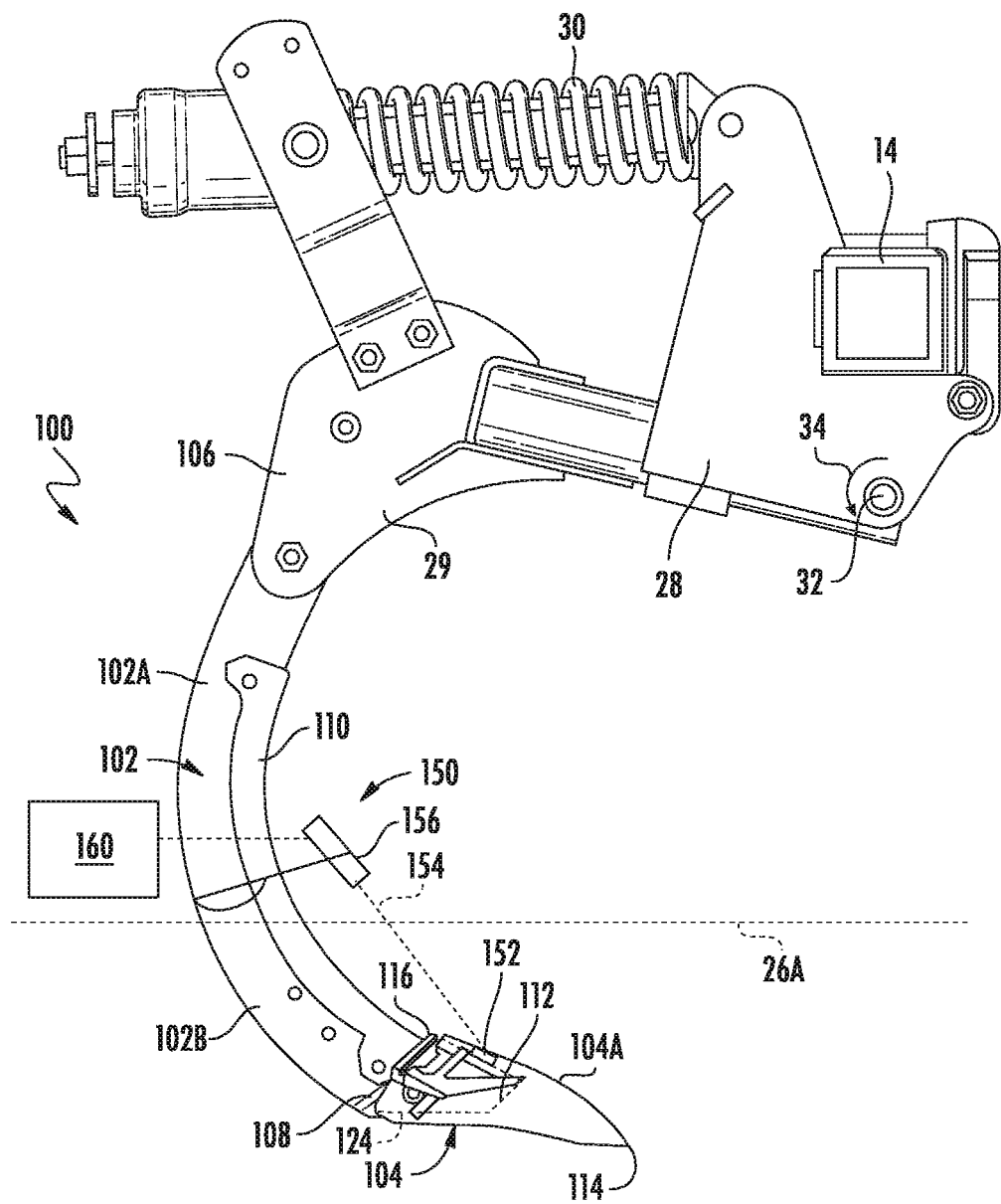
FIG. 2 illustrates a side view of a shank assembly of the agricultural implement shown in FIG. 1, particularly illustrating one embodiment of a system for monitoring the presence of an associated shank attachment member in accordance with aspects of the present subject matter.

Referring now to FIG. 2, a side view of an example embodiment of a shank assembly 100 suitable for use with an agricultural implement (e.g., the tillage implement 10 shown in FIG. 1) is illustrated in accordance with aspects of the present subject matter. It should be appreciated that, for purposes of discussion, the shank assembly 100 will be described with reference to the tillage implement 10 shown in FIG. 1. However, those of ordinary skill in the art will readily appreciate that the disclosed shank assemblies 100 may be utilized with any suitable agricultural implements having any other suitable implement configuration(s).

In general, as shown in FIG. 2, the shank assembly 100 may include a shank 102 and one or more frame members configured to pivotally couple the shank 102 to the implement frame 14. For instance, the shank 102 may extend lengthwise between a proximal end 106 and a distal end 108, with the proximal end 106 being configured to be coupled to the implement frame 14, e.g., via a mount 28 rigidly coupled to the implement frame 14, and the distal end 108 being configured to be coupled to the tillage point 104. The shank 102 has an upper portion 102A and a lower portion 102B, with the upper portion 102A configured to be disposed above the ground surface 26A and the lower portion 102B configured to be disposed below the ground surface 26A when the shank 102 is in its ground-engaging or working position (i.e., the position shown in FIG. 2). As shown in FIG. 2, the shank assembly 100 may also include a biasing member 30 (e.g., a spring) coupled between the shank 102 (e.g., via a pivot bracket 29) and the mount 28 to bias the shank 102 towards its working position relative to the frame 14. For instance, the biasing member 30 may bias the shank 102 downwardly such that the shank pivots about a pivot point 32 defined between the pivot bracket 29 and the mount 28 back towards its ground-engaging position (e.g., in pivot direction indicated by arrow 34) following temporary pivotal movement of the shank 102 in the opposite direction as the shank 102 encounters rocks or other impediments in the field during operation of the implement 10. Additionally, in some embodiments, the shank assembly 100 may include a shin 110 configured to be coupled to the shank 102 above the tillage point 104 to protect the shank 102 from wear.

Still referring to FIG. 2, the tillage point 104 may generally include a body 112 extending lengthwise between a tip end 114 and an opposed retention end 116. In general, the tip end 114 of the tillage point 104 may be configured to enable high-speed operation of the tillage implement 10, while still producing a smooth soil surface 26A. For instance, in one embodiment, the orientation of the tip end 114 of the body 112 may be angled downwardly with respect to a horizontal plane of movement of the tillage point 104 through the soil 26, which may reduce the overall amount of drag on the body 112 during operation of the implement 10. In addition, the tip end 114 of the body 112 may be substantially flat in the lateral or cross-wise direction of the body 112, thereby further reducing drag on the body 112. However, in other embodiments, the tip end 114 of the tillage point 104 may have any other suitable configuration that allows the tillage point 104 to generally function as described herein. Moreover, the retention end 116 of the body 112 may generally be configured to allow the distal end 108 of the shank 102 to be coupled to the tillage point 102. For instance, in one embodiment, the body 112 includes a retention slot 124 defined therein for receiving the distal end 108 of the shank 102.

In accordance with aspects of the present subject matter, FIG. 2 also illustrates components of one embodiment of a system 150 for monitoring the installation status of the tillage point 104. However, in other embodiments, the system 150 may be utilized to monitor the installation status of any other suitable attachment members, such as blades, disks, shanks, and/or the like. As shown in FIG. 2, the system 150 includes at least one wireless signal transmission device 152 (also referred to herein simply as "signal transmitter") configured to wirelessly transmit signals (as indicated by dashed lines 154) to an associated signal receiver or antenna 156. In general, the signal transmitter 152 may be configured to be positioned on or within the tillage point 104 at a suitable location that allows the transmitter 152 to transmit wireless signals 154 to the associated antenna 156 while the tillage point 104 is coupled to the shank 102. For instance, as shown in FIG. 2, the signal transmitter 152 is positioned on an upper side of an outer surface 104A of the tillage point 104, towards the retention end 116 of the tillage point 104. In some embodiments, the signal transmitter 152 may be recessed into the outer surface 104 of tillage point 104 such that the signal transmitter 152 does not impact or change the flow of soil over the tillage point 104 during a tillage operation. When the tillage point 104 falls off or otherwise becomes detached from the shank 102, the wireless signals 154 will no longer be received by the associated antenna 156.

In one embodiment, the signal transmitter 152 may be configured as an RFID tag, such as an active RFID tag or a passive RFID tag. In such an embodiment, the associated antenna 156 may form part of or may be communicatively coupled to a suitable RFID interrogator or reader. For instance, if the signal transmitter 152 corresponds to a passive RFID tag, the antenna 156 may form part of or may be communicatively coupled to an active RFID reader configured to actively transmit interrogation signals to the associated RFID tag and receive the corresponding reply signals from the tag. Similarly, if the signal transmitter 152 corresponds to an active RFID tag, the antenna 156 may form part of or may be communicatively coupled to a passive RFID reader configured to receive the radio signals transmitted from the tag.

In other embodiments, the signal transmitter 152 may be configured as any other suitable component(s) and/or device(s) configured to transmit wireless signals 154 for receipt by an associated antenna 156 using any suitable wireless communication protocol(s) or other suitable wireless signal transmission technology. For instance, in some embodiments, the signal transmitter 152 may be configured to transmit short-range wireless signals using Bluetooth, Near-Field Communications, WiFi, Zigbee, RuBee, and/or any other suitable short-range wireless communication protocol. Suitable wireless signals 154 configured to be transmitted by the signal transmitter 152 (and received by the associated antenna 156) may include, but are not limited to, signals in the form of radio waves, magnetic waves, other forms of electromagnetic waves, and/or the like.

In several embodiments, the antenna 156 may be configured to be installed at any suitable position on the shank assembly 100 that allows the antenna 156 to receive the wireless signals 154 transmitted from the associated signal transmitter 152 while the tillage point 104 is coupled to the shank 102. For instance, when the signal transmitter 152 has a given wireless transmission range, the antenna 156 may be installed at any suitable location on the shank assembly 100 that falls within such wireless transmission range. For example, as shown in FIG. 2, the antenna 156 may be mounted at any suitable position along the upper portion 102A of the shank 102. As such, the antenna 156 may be configured to remain above the ground surface 26A during the performance of an agricultural operation with the associated implement 10, in such embodiment, the signal strength of the wireless signals 154 of the signal transmitter 152 may be strong enough that the antenna 156 may detect the wireless signals while the signal transmitter 152 is below the ground surface 26A. In other embodiments, the signal strength of the wireless signals 154 of the signal transmitter 152 may require the tillage point 104 to be moved above the ground surface 26A for the wireless signals 154 to be received by the antenna 156, such as when the implement 10 is being turned at the headlands and the shanks 102 are raised out of the ground. Further, when the antenna 156 is mounted to the shank 102, the antenna 156 may maintain its position relative to the signal transmitter 152 when the shank 102 is biased away from its working position relative to the frame 14. As such, the antenna 156 may maintain the signal transmitter 152 within its detection range regardless of the position of the shank 102.

It should be appreciated that, in some embodiments, the signal strength of the signal transmitter 152 and/or the receiving strength of the antenna 156 may be configured such that each antenna 156 may only receive the wireless signals 154 corresponding to a single respective tillage point 104. As such, in one embodiment, a signal transmitter 152 may be provided in operative association with each tillage point 104 of the implement 10, with the wireless signals from each signal transmitter 152 configured to be received by a respective antenna 156 of the disclosed system 150. In such embodiment, it may be easier to detect which tillage point 104 has fallen off without requiring separate identifying wireless signals 154 for each tillage point 104. Thus, the signal transmitters 152 may be more easily replaceable if lost or broken.

Figure 3:
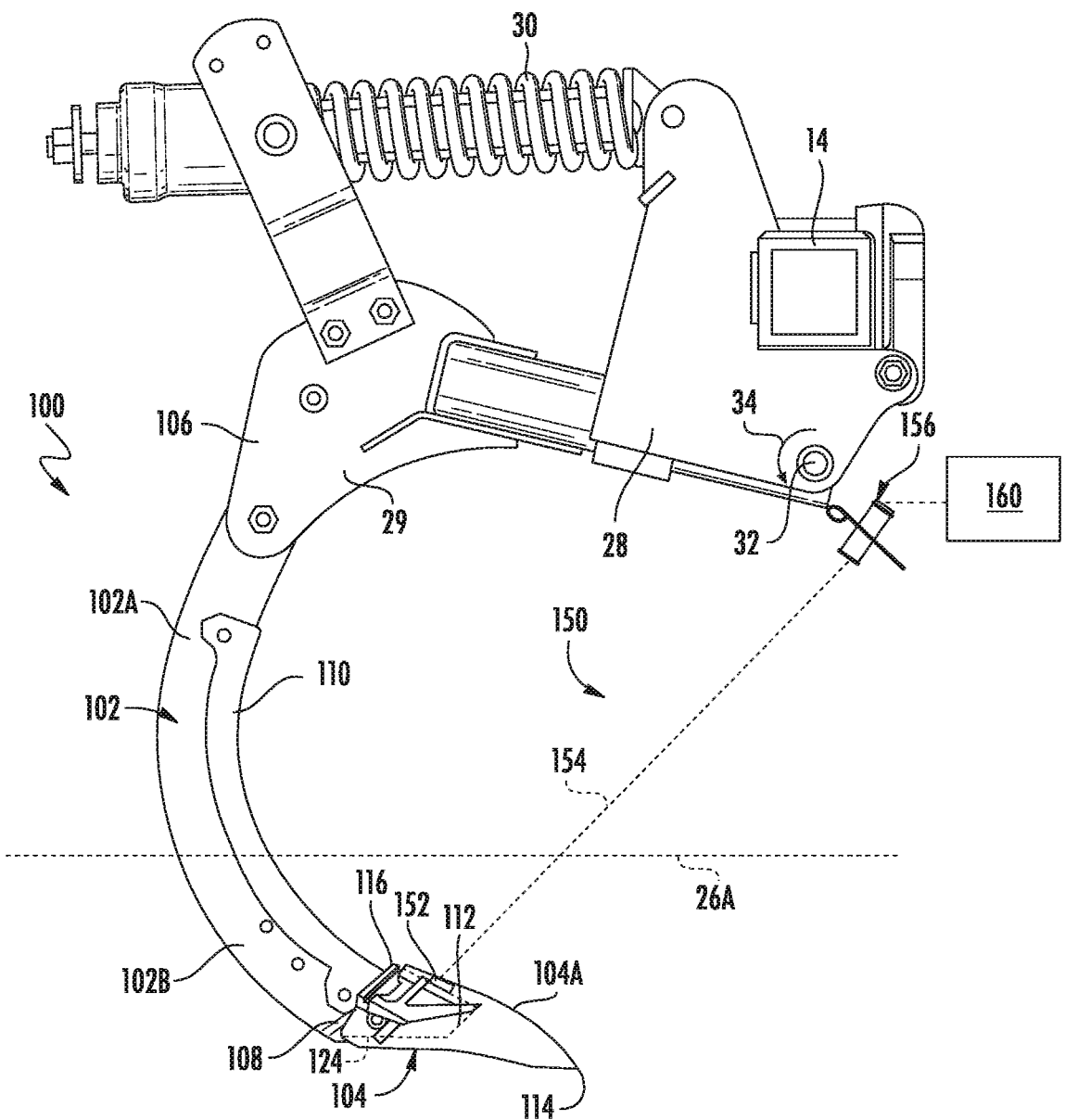
FIG. 3 illustrates another side view of the shank assembly shown in FIG. 2, particularly illustrating another embodiment of a system for monitoring the presence of an associated shank attachment member in accordance with aspects of the present subject matter.

In an alternative embodiment, the antenna 156 may be positioned on one of the frame members of the associated shank assembly 100, such as the mount 28 or the pivot bracket 29. For example, FIG. 3 illustrates an exemplary view of a variation of the associated antenna 156 described above with reference to FIG. 2. As shown in FIG. 3, the antenna 156 may be coupled to the mount 28 of the shank assembly 100 configured to support the shank 102 relative to the implement frame 14. Similar to the antenna 156 mounted on the shank 102 in FIG. 2, the antenna 156 of FIG. 3 may be configured to remain above the ground surface 26A during the performance of an associated agricultural operation. In such embodiment, the signal strength of the wireless signals 154 of the signal transmitter 152 may be strong enough that the antenna 156 may detect the wireless signals while the signal transmitter 152 is below the ground surface 26A. In other embodiments, the signal strength of the wireless signals 154 of the signal transmitter 152 may require the tillage point 104 to be moved above the ground surface 26A for the wireless signals 154 to be received by the antenna 156, such as when the implement 10 is being turned at the headlands and the shanks 102 are raised out of the ground. Further, the antenna 156 may have a sensing range in which the wireless signals 154 are receivable. In some embodiments, when the antenna 156 is mounted to a frame member of the shank assembly 100, such as the mount 28, the shank 102 may be rotated about the pivot point 34 such that the wireless signals 154 transmitted by the signal transmitter 152 are out of the sensing range. As such, the configuration of the system 150 shown in FIG. 3 may further be used to monitor the position of the shank 102.

Figure 4:
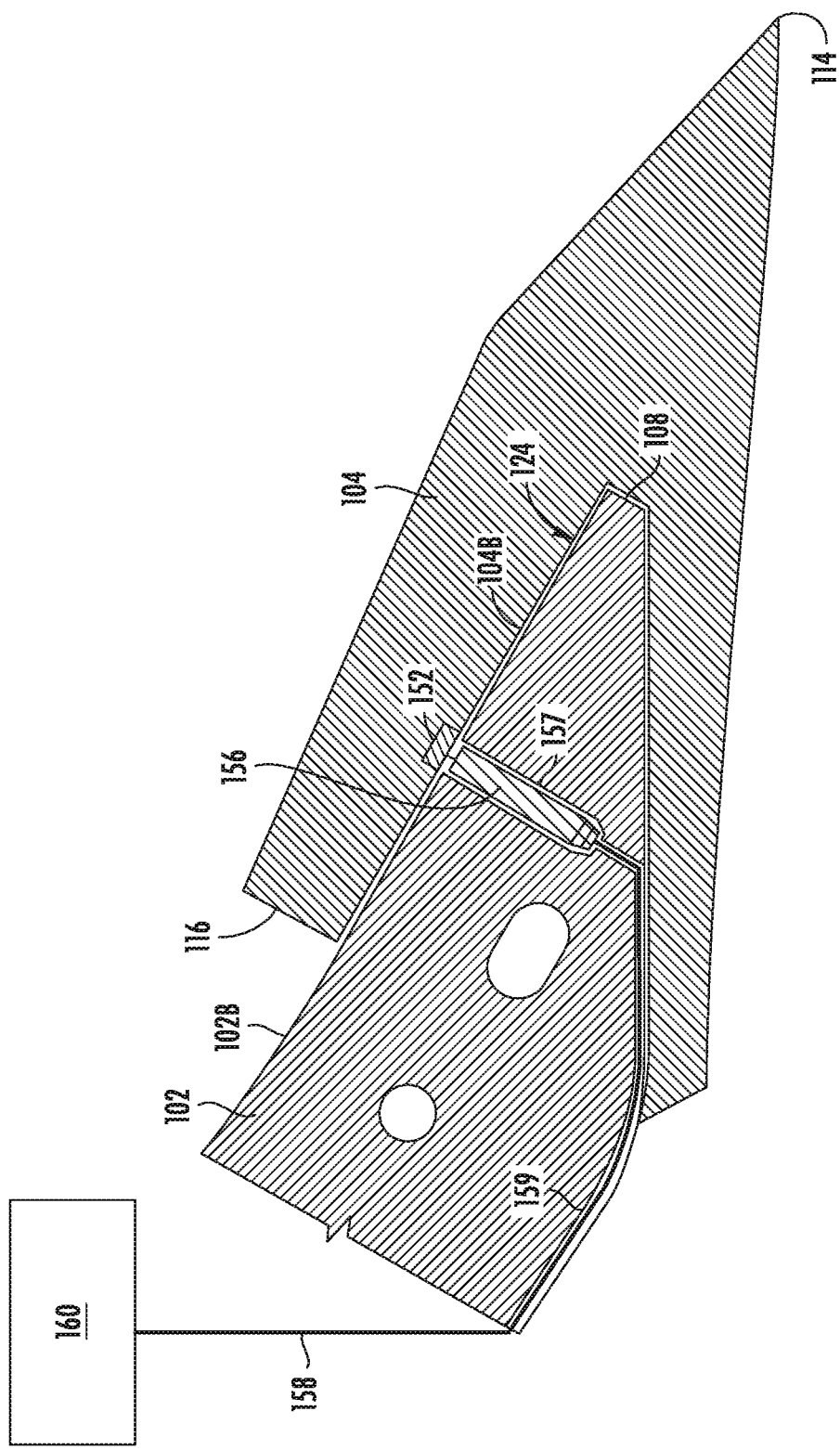
FIG. 4 illustrates a partial, cross-sectional view of the distal end of the shank assembly shown in FIG. 2, particularly illustrating another embodiment of a system for monitoring the presence of an adjacent shank attachment member in accordance with aspects of the present subject matter.

In a further alternative embodiment, the antenna 156 may be positioned on the lower portion 102B of the shank 102 configured to be located below the soil surface 26A during the performance of an associated agricultural operation. For example, FIG. 4 illustrates a partial, cross-sectional view of the shank assembly 100 and tillage point 104, with the associated antenna 156 described above with reference to FIG. 2 installed relative to the lower portion 102B of the shank 102. As described above, the retention slot 124 defined in the body 112 of the tillage point 104 is configured for receiving the distal end 108 of the shank 102. As shown in FIG. 4, the signal transmitter 152 may, in some embodiments, be at least partially embedded or otherwise positioned within the retention slot 124 of the tillage point 104. In some instances, the wireless signals 154 generated by the signal transmitter 152 may not fully pass through the tillage point material without losing some or all of its signal strength when the tillage point 104 is installed on the shank 102. Accordingly, the antenna 156 may be mounted on the lower portion 102B of the shank 102 such that the antenna 156 is close enough to receive the wireless signals 154. For instance, in some embodiments, the antenna 156 may be at least partially embedded within the shank 102. For example, in the illustrated embodiment, the antenna 156 is installed within a bore hole or opening 157 defined in the lower portion 102B of the shank 102. In some embodiments, the opening 157 may be configured such that the antenna 156 is positioned within the retention slot 124 adjacent to the signal transmitter 152 when the shank 102 is received within the retention slot 124.

By positioning the signal transmitter 152 within the tillage point 104, e.g., within the retention slot 124 of the tillage point 104, and by positioning the antenna 156 within the portion of the shank 102 that is received within the retention slot 124 of the tillage point 104, the signal transmitter 152 and antenna 156 may be protected from environmental factors, thereby allowing the signal transmitter 152 and the antenna 156 to generate and transmit the wireless signals 154, respectively, indicative of the installation status of the tillage point 104 while the implement 10 is operating and the tillage point 104 is located below the ground surface 26A.

It should be appreciated that, when the antenna 156 is configured to be embedded within the lower portion 102B of the shank 102, the antenna 156 may be powered and in communication with an associated controller 160 of the system 159 using any suitable powered/communicative link and/or configuration(s). For example, as shown in FIG. 4, each antenna 156 may be electrically connected to the controller 160 via a cable or wire 158 running to the opening 157 of the shank 102. In such an embodiment, the shank 102 may further be configured with a channel 159 to protect the cable 158 from damage during operation of the implement 10. Alternatively or additionally, each antenna 156 may be powered by its own battery (not shown) and/or may be wirelessly connected to the controller 160, as described above.

It should be appreciated that, although the antenna 156 is shown in FIGS. 2-4 as being coupled to or positioned on components of the shank assembly 100, the antenna 156 may, instead, be coupled to or positioned on any other suitable component of the implement 10 that allows the antenna 156 to receive the wireless signals 154 from the transmitter 152. For instance, the antenna 156 may be positioned on a portion of the implement frame 14.

Figure 5:
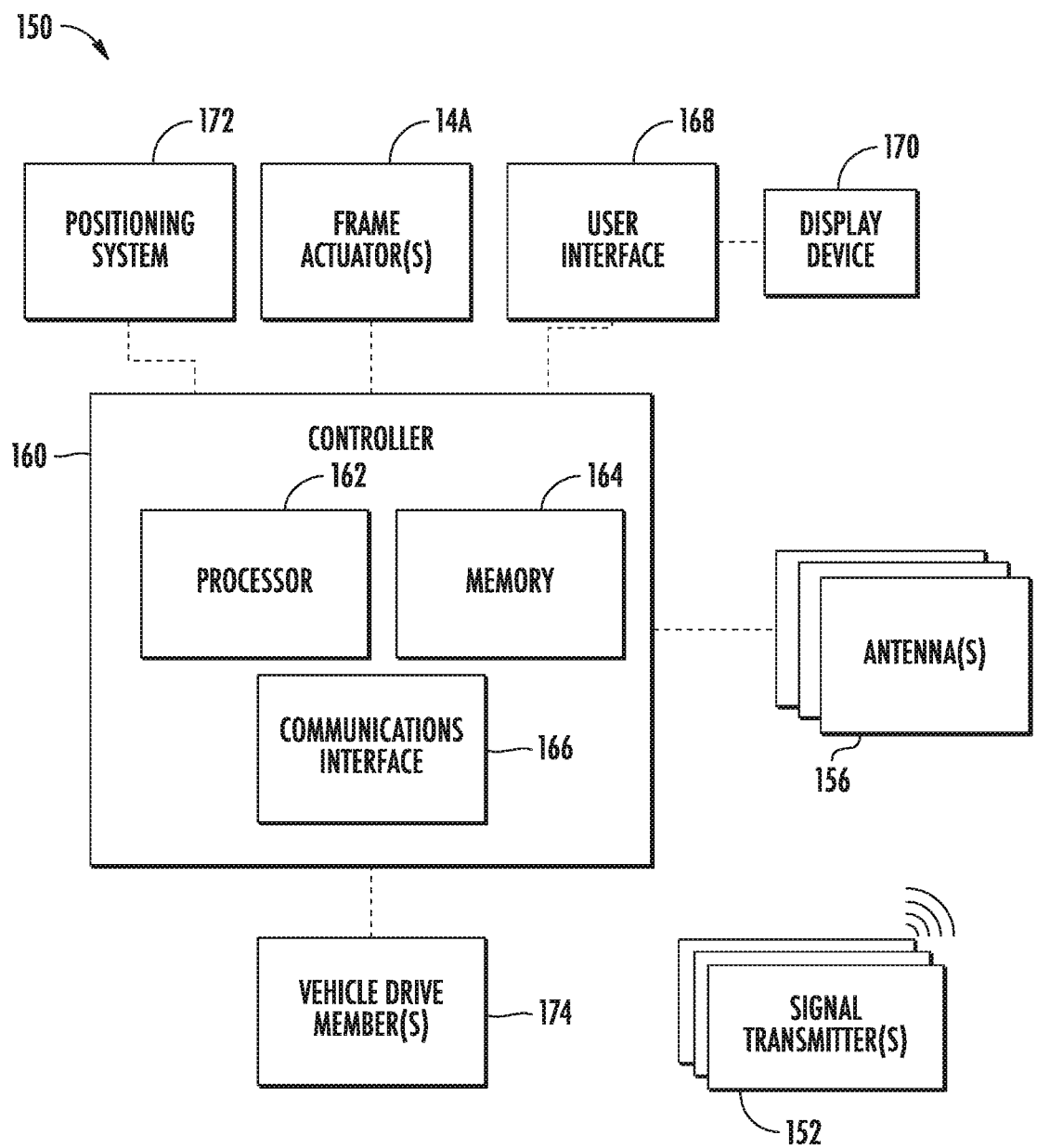
FIG. 5 illustrates a schematic view of one embodiment of a system for monitoring the presence of shank attachment members of an agricultural implement in accordance with aspects of the present subject matter.

Referring now to FIG. 5, a schematic view of one embodiment of a system 150 for monitoring the status of shank attachment members of an agricultural implement (e.g., the presence of the shank attachment members) is illustrated in accordance with aspects of the present subject matter. In general, the system 150 will be described herein with reference to the agricultural implement 10 described above with reference to FIG. 1, as well as the shank assemblies 100, tillage points 104, and the associated system components described above with reference to FIGS. 2-4. However, it should be appreciated by those of ordinary skill in the art that the disclosed system 150 may generally be used with agricultural implements 10 having any other suitable implement configuration and/or shank assemblies 100 having any other suitable shank configuration or associated shank attachment members.

As indicated above, in several embodiments, the system 150 may include a signal transmitter 152 installed on or within each shank attachment member (e.g., each tillage point 104) and a signal receiver or antenna 156 configured to receive the wireless signals 154 transmitted from each respective signal transmitter 152. Additionally, as indicated above, the system 150 may also include a controller 160 communicatively coupled to the antenna(s) 156. The controller 160 may be configured to infer the installation status of the associated shank attachment member based on the signals received by the associated antenna 156 from the associated signal transmitter 152 (or a lack thereof). Additionally, the controller 160 may be configured to execute one or more control actions in response to the determination that the associated shank attachment member is detached from the shank 102.

In general, the controller 160 may comprise any suitable processor-based device known in the art, such as a computing device or any suitable combination of computing devices. Thus, in several embodiments, the controller 160 may include one or more processor(s) 162, and associated memory device(s) 164 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 164 of the controller 160 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 164 may generally be configured to store suitable computer-readable instructions that, when implemented by the processor(s) 162, configure the controller 160 to perform various computer-implemented functions, such as one or more aspects of the methods and algorithms that will be described herein. In addition, the controller 160 may also include various other suitable components, such as a communications circuit or module, one or more input/output channels, a data/control bus and/or the like.

It should be appreciated that, in several embodiments, the controller 160 may correspond to an existing controller of the agricultural implement 10 and/or of the work vehicle to which the implement 10 is coupled. However, it should be appreciated that, in other embodiments, the controller 160 may instead correspond to a separate processing device. For instance, in one embodiment, the controller 160 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 160 may be configured to include a communications module or interface 166 to allow for the controller 160 to communicate with any of the various other system components described herein. For instance, in several embodiments, the controller 160 may be configured to receive signal data associated with the signals received by antenna(s) 156 from the signal transmitter(s) 152 that is used to monitor the installation status of the tillage points 104. The controller 160 may be communicatively coupled to the antenna(s) 156 via any suitable connection, such as a wired or wireless connection, to allow signals 154 or associated signal data indicative of the presence of the tillage points 104 to be transmitted from the antenna(s) 156 to the controller 160.

The controller 160 may be configured to determine the installation status or presence of each of the tillage points 104 based on the signals 154 received from each signal transmitter 152 via the associated antenna 156. For example, the controller 160 may include one or more suitable algorithms stored within its memory 164 that, when executed by the processor 162, allow the controller 160 to determine the status of the presence of the tillage points 104 based on the received signals 154. The controller 160 may be configured to monitor the status of the presence of the tillage points 104 periodically, continuously, or only as demanded by an operator of the implement 10. For example, in some embodiments, the controller 160 may collect data from one or more of the antennas 156 periodically based on some predetermined delay period or sampling frequency, such as after a predetermined period of time (e.g., a set amount of operating time), after a certain operating distance covered (e.g., a set amount of acres worked by the implement 10), after a certain number of actuations of the frame 14 between its raised and lowered positions, and/or the like.

Further, the controller 160 may be configured to perform one or more control actions based on the determination of the status of the presence of the various tillage points 104. For instance, the controller 160 may be configured to indicate to an operator the status of the presence (or lack thereof) of each of the tillage points 104. For example, in the embodiment shown in FIG. 5, the communications module 166 may allow the controller 160 to communicate with a user interface 168 having a display device 170, with the display device 170 being configured to display presence information regarding one or more of the tillage points 104. However, it should be appreciated that the controller 160 may instead be coupled to any number of other indicators, such as lights, alarms and/or the like to provide an indicator to the operator regarding the condition of the tillage points 104.

Is some embodiments, the controller 160 may further be configured to indicate to an operator the location within the field at which each monitored tillage point falls off or otherwise becomes decoupled from its respective shank 102. For example, in the embodiment shown in FIG. 5, the controller 160 is configured to be in communication with a positioning system 172 (e.g., a GPS-based positioning system), with the positioning system 172 being configured to identify the current location of the implement 10. In such an embodiment, the controller 160 may be configured to monitor the current location of the implement 10 as it simultaneously monitors the installation status or presence of each monitored point 104. When it is detected that a given point 104 is no longer installed relative to its respective shank 102, the controller 160 may store the current field location of the implement 10 within its memory 164. The controller 160 may then create an alert or log of alerts to indicate to an operator the location(s) of the missing tillage point(s) 104 within the field, which may, for example, be displayed to the operator via the user interface 160.

In further embodiments, the controller 160 may be configured to perform one or more implement-related control actions based on the determination of the status of the presence of the various tillage points 104. Specifically, in some embodiments, the controller 160 may be configured to control one or more components of the agricultural implement 10 based on the determination of the presence of the tillage points 104. For example, as shown in FIG. 5, the controller 160 may be configured to control one or more frame actuators 14A to move the implement frame 14 into its raised position when it is determined that one or more of the tillage points 104 is missing.

Additionally or alternatively, in some embodiments, the controller 160 may be configured to perform one or more vehicle-related control actions based on the determination of the status or presence of the tillage points 104. For example, as shown in FIG. 5, in some embodiments, the controller 160 may be configured to control the operation of one or more vehicle drive components 174 configured to drive the vehicle coupled to the implement, such as the engine and/or the transmission of the vehicle. In such embodiments, the controller 160 may be configured to control the operation of the vehicle drive component(s) 174 based on the determination of the presence of the tillage points 104, for example, to bring the vehicle and implement 10 to a stop when it is determined that one or more of the tillage points 104 is missing.

It should be appreciated that, depending on the type of controller 160 being used, the above-described control actions may be executed directly by the controller 160 or indirectly via communications with a separate controller. For instance, when the controller 160 corresponds to an implement controller of the implement 10, the controller 160 may be configured to execute the implement-related control actions directly while being configured to execute the vehicle-related control actions by transmitting suitable instructions or requests to a vehicle-based controller of the vehicle towing the implement 10 (e.g., using an ISObus communications protocol). Similarly, when the controller 160 corresponds to a vehicle controller of the vehicle towing the implement 10, the controller 160 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 160 may be configured to execute both the implement-based control actions and the vehicle-based control actions directly or the controller 160 may be configured to execute both of such control action types indirectly via communications with a separate controller.

Figure 6:
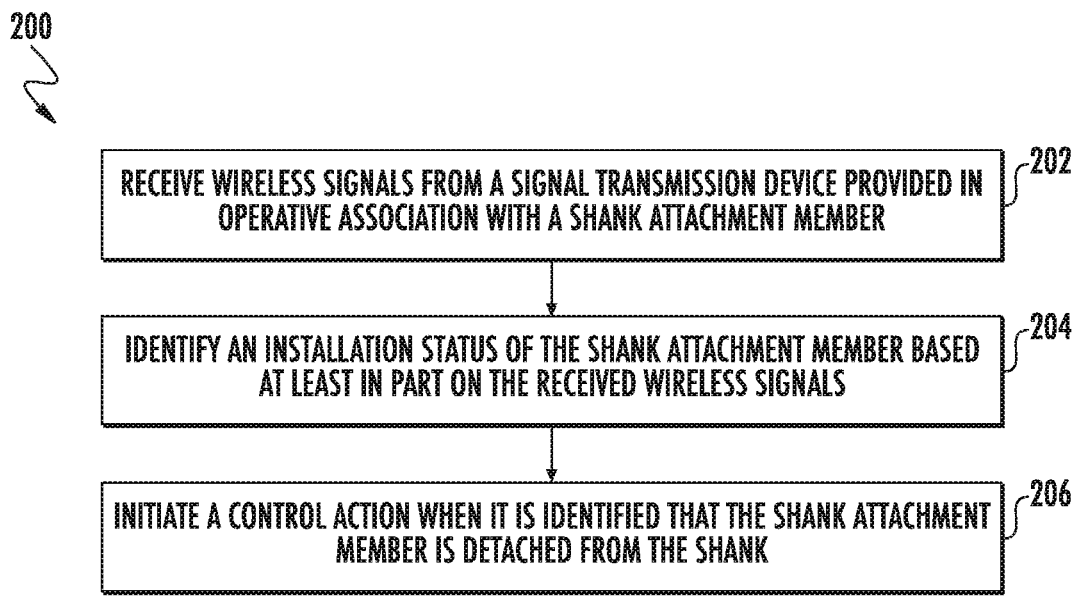
FIG. 6 illustrates a flow diagram of one embodiment of a method for monitoring the presence of shank attachment members of an agricultural implement in accordance with aspects of the present subject matter.

Referring now to FIG. 6, a flow diagram of one embodiment of a method 200 for monitoring the presence of shank attachment members of an agricultural implement is illustrated in accordance with aspects of the present subject matter. In general, the method 200 will be described herein with reference to the agricultural implement 10, and the system 150, the shank assembly 100, and the associated shank attachment member 104 described above with reference to FIGS. 1-5. However, it should be appreciated by those of ordinary skill in the art that the disclosed method 200 may generally be implemented with any agricultural implement having any suitable implement configuration, any ground engaging tool having any suitable tool configuration, and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving wireless signals from a signal transmission device provided in operative association with a shank attachment member. For instance, as described above, each signal transmitter 152 may be provided in operative association with a respective shank attachment member 104 and may be configured to transmit wireless signals 154 to an associated antenna 156. Such received signals and/or related data may then be transmitted from the antenna 156 to the controller 156 for subsequent processing and/or analysis.

Further, at (204), the method 200 may include identifying an installation status of the shank attachment member based at least in part on the received wireless signals. Generally, as indicated above, the controller 160 may determine that the shank attachment member 104 is attached to the shank 102 when the wireless signals 154 are being received by the antenna 156 or that the shank attachment member 104 is no longer attached to the shank 102 when the wireless signals 154 are no longer being received by the antenna 156.

Additionally, at (206), the method 200 may include initiating a control action when it is identified that the shank attachment member is detached from the shank. For instance, as indicated above, the controller 160 may be configured to notify an operator of the implement that the shank attachment member 104 is no longer installed (e.g., via the user interface 168) and/or of the position of the implement 10 at which it was determined that the shank attachment member 104 became detached from the shank 102. Additionally or alternatively, the controller 160 may be configured to adjust the operation of the implement 10, such as by adjusting a position of the frame (e.g., by controlling the frame actuator(s) 14A), and/or adjust the operation of one or more vehicle drive components 174 configured to drive the vehicle coupled to the implement 10 (e.g., to slow down or stop the implement 10) when it is identified that the shank attachment member 104 is no longer attached to the shank 102.

It is to be understood that the steps of the method 200 are performed by the controller 160 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 160 described herein, such as the method 200, is implemented in software code or instructions which are tangibly stored on a tangible computer readable medium. The controller 160 loads the software code or instructions via a direct interface with the computer readable medium or via a wired and/or wireless network. Upon loading and executing such software code or instructions by the controller 160, the controller 160 may perform any of the functionality of the controller 160 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring an installation status of shank attachment members of agricultural implements, the system comprising:
    a shank assembly comprising:
        a shank extending between a proximal end and a distal end, the shank having an upper portion and a lower portion, the upper portion including the proximal end, the lower portion including the distal end; and
        at least one mounting element configured to couple the proximal end of the shank to a frame of an agricultural implement;
    a shank attachment member coupled to the distal end of the shank;
    a biasing member configured to bias the shank assembly relative to the frame toward a working position such that the shank attachment member and the lower portion of the shank are positioned at least partially below a ground surface of a field and the upper portion of the shank is disposed above the ground surface when the shank assembly is in the working position;
    a signal transmission device supported by the shank attachment member, the signal transmission device configured to transmit wireless signals;
    an antenna configured to receive the wireless signals transmitted from the signal transmission device, the antenna being positioned on the upper portion of the shank such that the antenna is above the ground surface of the field when the shank assembly is in the working position; and
    a controller communicatively coupled to the antenna, the controller configured to determine an installation status of the shank attachment member based at least in part on the wireless signals received by the antenna from the signal transmission device.

2. The system of claim 1, wherein the controller is configured to determine that the shank attachment member is detached from the shank based on a lack of wireless signals received by the antenna.

3. The system of claim 1, wherein the controller is configured to adjust an operation of an agricultural implement based at least in part on the installation status of the shank attachment member.

4. The system of claim 1, wherein the signal transmission device comprises an RFID tag.

5. An agricultural implement, comprising:
    a frame;
    a plurality of shank assemblies coupled to the frame, each shank assembly of the plurality of shank assemblies comprising:
        a shank extending between a proximal end and a distal end, the shank having an upper portion and a lower portion, the upper portion including the proximal end, the lower portion including the distal end; and
        at least one mounting element configured to couple the proximal end of the shank to a portion of the frame such that a respective shank assembly of the plurality of shank assemblies is pivotal relative to the frame independently of others of the plurality of shank assemblies toward and away from a working position;
    a plurality of shank attachment members, each shank attachment member of the plurality of shank attachment members being coupled to the distal end of the shank of a respective shank assembly of the plurality of shank assemblies, a respective shank attachment member of the plurality of shank attachment members and the lower portion of the shank of the respective shank assembly of the plurality of shank assemblies being positioned at least partially below a ground surface of a field and the upper portion of the shank of the respective shank assembly of the plurality of shank assemblies being positioned above the ground surface when the respective shank assembly is in the working position;
    a signal transmission device supported by at least one shank attachment member of the plurality of shank attachment members, the signal transmission device configured to transmit wireless signals;
    an antenna configured to receive the wireless signals transmitted from the signal transmission device, the antenna being positioned on the at least one mounting element or on the upper portion of the shank of the respective shank assembly to which the at least one shank attachment member is coupled such that the antenna is above the surface of the field when the respective shank assembly of the plurality of shank assemblies is in the working position; and
    a controller communicatively coupled to the antenna, the controller configured to determine an installation status of the at least one shank attachment member based at least in part on the wireless signals received by the antenna from the signal transmission device.

6. The implement of claim 5, wherein the signal transmission device comprises an RFID tag.

7. The implement of claim 5, wherein the plurality of shank attachment members comprises tillage points.

8. A method for monitoring an installation status of shank attachment members of an agricultural implement, the agricultural implement comprising a shank assembly having a shank extending between a proximal end and a distal end, the shank having an upper portion and a lower portion, the upper portion including the proximal end, the lower portion including the distal end, the shank assembly further having at least one mounting element configured to couple the proximal end of the shank to a frame of the agricultural implement, the agricultural implement further comprising a shank attachment member coupled to the distal end of the shank, and the agricultural implement additionally comprising a biasing member configured to bias the shank relative to the frame toward a working position such that the shank attachment member and the lower portion of the shank are positioned at least partially below a ground surface of a field and the upper portion of the shank is positioned above the ground surface when the shank is in the working position, the method comprising:

receiving, with a computing device, wireless signals from a signal transmission device supported by the shank attachment member via an antenna positioned on the upper portion of the shank or on the at least one mounting element such that the antenna is above the ground surface of the field when the shank is in the working position;

identifying, with the computing device, an installation status of the shank attachment member based at least in part on the received wireless signals; and initiating, with the computing device, a control action when it is identified that the shank attachment member is detached from the shank.

9. The method of claim 8, wherein the control action comprises controlling an operation of the agricultural implement to adjust an operating parameter of the agricultural implement when it is identified that the shank attachment member is detached from the shank.

10. The method of claim 8, wherein the control action comprises notifying an operator of the agricultural implement when it is identified that the shank attachment member is detached from the shank.

11. The method of claim 8, wherein the control action comprises notifying an operator of the agricultural implement of a location within the field at which it was determined that the shank attachment member became detached from the shank.

12. The method of claim 8, wherein receiving the wireless signals from the signal transmission device comprises receiving radio signals from an RFID tag.

* * * * *